(12) United States Patent
Baud et al.

(10) Patent No.: US 11,844,746 B2
(45) Date of Patent: Dec. 19, 2023

(54) PROTECTIVE HOUSING FOR A BIOPHARMACEUTICAL LIQUID BAG, PROTECTIVE ASSEMBLY AND METHOD OF ASSEMBLY THEREOF

(71) Applicant: SARTORIUS STEDIM FMT SAS, Aubagne (FR)

(72) Inventors: Stephane Baud, La Bouilladise (FR); Frédéric Bazin, Cassis (FR)

(73) Assignee: Sartorius Stedim FMT SAS, Aubagne (FR)

( * ) Notice: Subject to any disclaimer, the term of this patent is extended or adjusted under 35 U.S.C. 154(b) by 911 days.

(21) Appl. No.: 16/495,729

(22) PCT Filed: Mar. 28, 2018

(86) PCT No.: PCT/FR2018/000070
§ 371 (c)(1),
(2) Date: Sep. 19, 2019

(87) PCT Pub. No.: WO2018/178523
PCT Pub. Date: Oct. 4, 2018

(65) Prior Publication Data
US 2020/0016035 A1    Jan. 16, 2020

(30) Foreign Application Priority Data
Mar. 30, 2017  (FR) ..................... 1770320

(51) Int. Cl.
*A61J 1/16* (2023.01)
*A61J 1/10* (2006.01)
(Continued)

(52) U.S. Cl.
CPC . *A61J 1/10* (2013.01); *A61J 1/16* (2013.01); *B65D 43/022* (2013.01);
(Continued)

(58) Field of Classification Search
CPC .................................................. A61M 5/1413
(Continued)

(56) References Cited

U.S. PATENT DOCUMENTS 4,337,769 A * 7/1982 Olson .................. A61M 39/22
                                                          604/408
4,402,407 A * 9/1983 Maly .................. B65D 77/2004
                                                          426/118
(Continued)

FOREIGN PATENT DOCUMENTS

EP      1993921 B1    1/2011
EP      3381430 A1    10/2018
(Continued)

OTHER PUBLICATIONS

English translation of Written Opinion of the International Searching Authority dated Jun. 29, 2018, for corresponding PCT International Application No. PCT/FR2018/000070.
(Continued)

*Primary Examiner* — Mollie Impink
(74) *Attorney, Agent, or Firm* — Heslin Rothenberg Farley & Mesiti P.C.; Victor A. Cardona, Esq.

(57) ABSTRACT

The invention relates to a protective housing for a biopharmaceutical liquid bag having a lower shell with a bottom and side walls, and an upper shell. The upper shell includes a housing for receiving the bag, and can be inserted into the lower shell, in such a way that the opening of the housing is adjacent to and facing the bottom of the lower shell, and in such a way that the upper shell is laterally held in place between the side walls of the lower shell.

30 Claims, 9 Drawing Sheets

(51) Int. Cl.
  *B65D 43/02* (2006.01)
  *B65D 21/02* (2006.01)
  *B65D 77/06* (2006.01)
(52) U.S. Cl.
  CPC ...... *B32B 2323/04* (2013.01); *B65D 21/0223* (2013.01); *B65D 21/0233* (2013.01); *B65D 21/0234* (2013.01); *B65D 77/06* (2013.01); *B65D 2543/00296* (2013.01); *B65D 2543/00324* (2013.01)
(58) Field of Classification Search
  USPC .................................................. 206/571, 438
  See application file for complete search history.

(56) References Cited

U.S. PATENT DOCUMENTS

| | | | | |
|---|---|---|---|---|
| 4,545,486 A * | 10/1985 | Bostic | ................... | G03B 21/54 206/455 |
| 4,697,703 A * | 10/1987 | Will | ...................... | B65D 25/10 206/525 |
| 4,771,917 A | 9/1988 | Heaps, Jr. et al. | | |
| 4,869,398 A * | 9/1989 | Colvin | ..................... | A61J 1/16 604/404 |
| 6,889,839 B1 * | 5/2005 | Rosten | ................. | B65D 81/075 206/583 |
| 6,991,108 B1 * | 1/2006 | Rorato | ..................... | A61L 2/26 220/4.27 |
| 8,006,839 B2 * | 8/2011 | Hafner | ................... | A61B 50/30 206/499 |
| 9,079,690 B1 * | 7/2015 | Pavlik | ....................... | A61J 1/10 |
| 9,944,436 B2 * | 4/2018 | Kalmanides | ......... | B65D 55/024 |
| 10,377,559 B1 * | 8/2019 | Boomsma | .......... | B65D 25/2811 |
| 10,589,197 B2 * | 3/2020 | Rhodes | ................. | C12M 29/04 |
| 2002/0107492 A1 * | 8/2002 | Brach | ................... | B65D 35/28 222/105 |
| 2004/0134203 A1 * | 7/2004 | Voute | ..................... | A23L 3/364 62/66 |
| 2005/0183976 A1 * | 8/2005 | Brothers | ............ | A61B 10/0096 206/438 |
| 2007/0209960 A1 * | 9/2007 | Leoncavallo | ...... | B65D 21/0234 220/4.27 |

FOREIGN PATENT DOCUMENTS

| | | | | |
|---|---|---|---|---|
| WO | WO-9009184 A | * | 8/1990 | ............... A01N 1/02 |
| WO | 2005040034 A2 | | 5/2005 | |
| WO | WO-2011144840 A1 | * | 11/2011 | ............. A45D 34/04 |

OTHER PUBLICATIONS

Preliminary Search Report for French Application No. 1770320 dated Jan. 11, 2018.
International Search Report (and English translation) and Written Opinion of the International Searching Authority for International Application No. PCT/FR2018/000070 dated Jun. 29, 2018.
Office Action from parallel EP Application No. 18165152.2 dated Jan. 31, 2023.

* cited by examiner

PROTECTIVE HOUSING FOR A BIOPHARMACEUTICAL LIQUID BAG, PROTECTIVE ASSEMBLY AND METHOD OF ASSEMBLY THEREOF

CROSS REFERENCE TO RELATED APPLICATIONS

This application is a national stage filing under section 371 of International Application No. PCT/FR2018/000070, filed on Mar. 28, 2018, published on Oct. 4, 2018 as WO 2018/178523 A1 which claims priority to French Patent Application No. 1770320, filed on Mar. 30, 2017. The entire disclosure of each application is hereby incorporated herein by reference.

FIELD OF THE INVENTION

The invention relates to the field of protective housings for biopharmaceutical liquid bags, the field of protective assemblies that integrate a protective housing and a biopharmaceutical liquid bag, as well as the field of methods for assembling a protective assembly that integrates a protective housing and a biopharmaceutical liquid bag.

CONTEXT OF THE INVENTION

According to a first prior art, a protective housing of biopharmaceutical liquid bags is known comprising on the one hand two upper and lower shells assembled one on the other, as well as two elastic plastic films situated inside these shells and surrounding two bags of biopharmaceutical liquid. The biopharmaceutical liquid bags are held in place between the films and protected from aggressions and external impacts to the protective housing by the spaces respectively maintained between on the one hand the upper shell and the upper film and on the other hand between the lower shell and the lower film. This protective housing provides a good holding of the biopharmaceutical liquid bags inside. On the other hand, this protective housing has shells of a complex and delicate structure, because of the elastic plastic film to be fastened onto each one of the shells, and takes up substantial space in height due to the two empty spaces stacked one on the other, the one between upper film and upper shell and the one between lower film and lower shell.

According to a second prior art, for example shown in patent application EP1993921, a protective housing for biopharmaceutical liquid bags is known comprising on the one hand two upper and lower shells assembled one on the other, and which surround a biopharmaceutical liquid bag. This protective housing has on the one hand the disadvantage either of an insufficient lateral hold of the biopharmaceutical liquid bag (case where the bag is smaller than the available inter-shell space) or of an excessive pressure exerted by the shells directly on the biopharmaceutical liquid bag (case where the bag is exactly dimensioned for the available inter-shell space), because of the constitution of the housing of the bag by the cooperation of the two shells between them (each shell defining only a portion of the housing), and on the other hand the disadvantage of a delicate mounting requiring the exact and precise superposition of the two shells via the cooperation of a set of pins and bores.

SUMMARY OF THE INVENTION

The purpose of the present invention is to provide a protective housing for a biopharmaceutical liquid bag, and/or a protective assembly of a biopharmaceutical liquid bag, and/or a method of assembly of a protective assembly of a biopharmaceutical liquid bag, that at least partially overcomes the aforementioned disadvantages.

More particularly, the invention aims to provide a protective housing of a biopharmaceutical liquid bag that improves the lateral holding of the bag, with this bag being held in a housing of an upper shell itself held between the walls of a lower shell into which it is inserted, without exerting any excessive stress on the biopharmaceutical liquid bag, and while still facilitating the assembly of the protective housing, the simple inserting of an upper shell into a lower shell, the upper shell defining the quasi-totality of the housing alone (the lateral movement in the housing being fully limited by the upper shell alone), thus resulting in a good compromise between on the one hand the effectiveness of holding the bag (without risking damaging this bag) and on the other hand the ease in assembling the protective housing.

According to a first object of the invention, a protective housing of a biopharmaceutical liquid bag is provided, comprising: a lower shell comprising a bottom and side walls, an upper shell: which comprises a housing for receiving the bag, and which can be inserted into the lower shell, in such a way that the opening of the housing is adjacent to and facing the bottom of the lower shell, and in such a way that the upper shell is laterally held in place between the side walls of the lower shell.

Of course, the biopharmaceutical liquid bag will be covered by the upper shell in such a way as to be in the housing, the upper shell being inserted into the lower shell.

Also of course, the opening of the housing is an opening through which the bag is introduced into the housing. The housing is not closed and remains open, with the bottom of the lower shell facing the opening remaining open of this housing.

A shell is a continuous and thin structure, with an at least partially curved surface, made rigid via its shape and by the nature of its constituents, preferably made of plastic, used as a cover or as a jacket.

According to this first object of the invention, a full biopharmaceutical liquid bag being placed in the protective housing, a protective assembly of a biopharmaceutical liquid bag is also provided comprising: a protective housing according to the invention, a biopharmaceutical liquid bag placed in said protective housing.

According to this first object of the invention, an empty pharmaceutical liquid bag being placed in the protective housing, also provided is a protective assembly of a bag for receiving a biopharmaceutical liquid comprising: a protective housing according to the invention, an empty bag for receiving biopharmaceutical liquid placed in said protective housing.

According to this first object of the invention, a full biopharmaceutical liquid bag being placed in the protective housing, a protective assembly of a biopharmaceutical liquid bag is further provided comprising: a biopharmaceutical liquid bag, a protective housing comprising: a lower shell comprising a bottom and side walls, an upper shell: which comprises a housing receiving the bag, and which is inserted into the lower shell, in such a way that the opening of the housing is in the vicinity and facing the bottom of the lower shell, and in such a way that the upper shell is laterally held in place between the side walls of the lower shell. Laterally means in all of the mean plane of the bottom of the lower shell, i.e. longitudinally as well as laterally "strictly speaking" i.e. "on the side": this is true throughout the text of the patent application, unless mentioned otherwise.

According to this first object of the invention, in order to easily carry out the assembly of the protective housing, even with the empty bag inside this protective housing, a method of assembly of a protective assembly of a biopharmaceutical liquid bag is in addition provided according to the invention, characterised in that: an operator attaches, using a first of his hands, the bag by its handle to the upper shell, with this upper shell being in the vertical position, with this upper shell remaining in the vertical position, this operator positions and maintains, by the second of his hands, the end of the bag opposite its handle against the upper shell in such a way that the bag is in its upper shell housing, this operator places the upper shell containing the bag in the lower shell placed in horizontal position.

According to a second object of the invention, in order to improve the holding of the bag by reducing its longitudinal movement in the housing of the upper shell and so as to be able to reduce and even suppress the "accordion" effect by immobilising the bag at the two longitudinal extremities of the housing by immobilising it, by attaching it or by blocking it at the two longitudinal ends of the upper shell, a protective assembly of a biopharmaceutical liquid bag is provided comprising: a biopharmaceutical liquid bag, a protective housing comprising: a lower shell comprising a bottom and side walls, an upper shell: which comprises a housing receiving the bag and which has two longitudinal ends, and which is inserted into the lower shell, in such a way that the opening of the housing is facing the bottom of the lower shell, and in such a way that the bag is held in place by being immobilised at the two longitudinal ends of the upper shell without touching the bottom or the side walls of the lower shell.

According to preferred embodiments, the invention comprises one or several of the following characteristics that can be used separately or in a partial combination of them or as a complete combination of them, with any one of the objects of the invention presented hereinabove.

Preferably, the distance between the opening of the housing and the bottom of the lower shell is at least three times less than the depth of the housing, preferably at least 6 times less than the depth of the housing, even more preferably at least 10 times less than the depth of the housing. Thus, the upper shell being closer to the bottom of the lower shell, the lateral movement of the bag, i.e. the movement of the bag in a plane parallel to the mean plane of the bottom of the lower shell, is more limited, and in this way the holding of the bag is improved.

Preferably, the upper shell can be inserted into the lower shell also in such a way that the opening of the housing is in contact with the bottom of the lower shell. Thus, the upper shell being in contact with the bottom of the lower shell, the lateral movement of the bag, i.e. the movement of the bag in a plane parallel to the mean plane of the bottom of the lower shell, is even further limited, and in this way the holding of the bag is further improved.

Preferably, the housing comprises a bottom, and side walls extending substantially perpendicularly to said bottom. This extension of the side walls of the upper shell perpendicularly to the bottom of the upper shell allows the housing to better reduce the lateral movement of the bag, i.e. the movement of the bag exactly between the walls of the upper shell. In this way, the bag is held laterally even better.

Preferably, the upper shell can be inserted into the lower shell also in such a way that an outer periphery of the upper shell is guided by the side walls of the lower shell. In this way, the assembly of the protective housing is rendered even easier.

Preferably, the upper shell also has outer side walls surrounding the side walls of the housing and extending substantially parallel to the side walls of the housing. In this way, the assembly of the protective housing is rendered even easier.

Preferably, the thickness of the upper shell is less than the thickness of the lower shell. In this way, the stacking of the protective housings one on the other will be facilitated.

Preferably, the upper shell can be inserted into the lower shell also in such a way as to not extend outside the lower shell in height. In this way, the stacking of the protective housings one on the other is made even easier, because this avoids exerting a vertical force or transmitting a vertical stress directly on the bag, even when the protective housings are stacked one on the other over several levels.

Preferably, the upper shell can be fully inserted into the lower shell. In this way, the upper shell which almost entirely surrounds the bag, will not directly be subject to the impacts coming from the outside of the protective housing, but will itself be protected by the lower shell. The protection of the bag against the mechanical aggressions and the impacts coming from the outside of the protective housing is thus improved. This protection against the impacts is then effective not only against the vertical impacts but also then against the horizontal impacts.

Preferably, at least when the upper shell is inserted into the lower shell, chicanes are arranged around the housing in such a way as to be able to hold in place around the housing at least one tube coming from the bag. In this way, the tube or tubes can also be stored in the protective housing by being held well in place. This good holding in place of the tubes also allows for sufficient tension on the connectors of tubes situated at one end of the bag thus further improving the holding of the bag with respect to the upper shell that protects it.

Preferably, even when the upper shell is not inserted into the lower shell, chicanes are arranged around the housing in such a way as to be able to hold in place around the housing at least one tube coming from the bag. In this way, the tube or tubes can be stored and held in place immediately as soon as the bag is introduced into the upper shell, without having to wait for the upper shell to be inserted into the lower shell.

Preferably, the upper shell also comprises, at least on one end of the housing for receiving the bottom of the bag, an edge surrounding the opening of the housing, extending preferably substantially in the plane of the opening of the housing.

Preferably, the upper shell comprises a fastener which is situated outside of the housing and which is arranged in such a way that the handle of the bottom of the bag can be attached to the fastener.

In this way, the longitudinal movement of the bag in the housing of the upper shell is further reduced, which improves because of this the lateral holding of the bag, i.e. the holding of the bag between the walls of the housing of this upper shell.

Preferably, the portion of the edge of the upper shell, situated between the fastener and said end of the housing, is arranged in such a way that, when the handle of the bottom of the bag attaches to the fastener, the connection between handle and bag bottom is wound around said portion of the edge. The bag bottom is close to the bottom of the housing, the handle is attached onto the fastener, and the connection that connects bag bottom on the one hand and handle on the other goes around the edge by following the shape of this edge. In this way, the holding of the bag is further improved thanks to the additional reduction in its longitudinal movement in the housing of the upper shell. Thus, the "accordion" effect, due to the intermediate portion between the hole of the handle and the bottom of the bag, which otherwise could have folded as an accordion onto itself, is reduced and even suppressed.

Preferably, the fastener is formed by one or several notches formed in a side wall of the upper shell. This is a particularly simple and effective way to carry out this fastener. These notches in the wall, in addition to the simplicity of manufacturing that is associated with them, also make it possible, thanks to their number, the adaptation to different handle widths for different types of bag.

Preferably, the housing is shorter than the upper shell in such a way as to clear a free space allowing for the outlet of the tube or tubes from the bag. In this way, the zone of the connector or connectors between the tube or tubes on the one hand and the bag on the other hand is protected better.

Preferably, the side wall of the lower shell situated on the side of the outlet of tube(s) of the bag comprises an outlet opening of the tube or tubes laterally outside the lower shell. This allows for access to the tube or tubes, even when the bag is inserted into the protective housing, thus allowing for a fully operational use of this bag, even inside its protective housing.

Preferably, said side wall of the lower shell comprises a recess arranged towards the inside of the lower shell and situated above or below said outlet opening. This allows for access to the tube or tubes, even when the bag is inserted into the protective housing and the protective housings are in addition stacked one on the other, with this recess then clearing an exit space that allows the tubes to escape through the top, or through the bottom, and not only horizontally which would have made them more sensitive to the impacts and to the direct transmission thereof towards the bag.

Preferably, the protective housing also comprises an outer cover that covers the upper shell and that closes the lower shell. This avoids exerting a vertical or lateral force that is excessively direct on the upper shell, which protects the bag better.

Preferably, the lower shell and the upper shell can be made integral together in such a way as to be able to be detached from one another later, and preferably the lower shell also comprises holes in one or several of its side walls arranged in such a way that the upper shell can be fastened to the lower shell by rivets. The protective housing is then closed better while still remaining flexible in use.

Preferably, the lower shell and the upper shell can be made integral together in such a way as to not be able to be detached from one another later without damage, and more preferably the lower shell also comprises holes in one or several of its side walls arranged in such a way that the upper shell can be fastened to the lower shell by rivets. The protective housing is then closed better and it even becomes inviolable, i.e. the bag cannot be extracted from the protective housing without damage, of course visible, of this same protective housing.

Preferably, the upper shell and the lower shell are made of plastic. Plastic offers better biocompatibility and facilitates the sterilisation of the bag and of its contents. Moreover, as plastic is less resistant than metal, the structure of the protective housing according to the invention becomes even more interesting in that it better redistributes the stress forces, in particular during the stacking of several protective housings one on the other.

Preferably, the plastic is polyethylene terephthalate glycol (PETG). This material PETG has, in addition to supporting gamma radiation and freezing well, the advantage of being transparent, which allows the user filling the biopharmaceutical liquid bag, when the latter is empty but already in the closed protective housing, to indeed be able to observe the filling and to guarantee the proper unfolding thereof.

Other examples of plastic that can be used for the lower shell and/or the upper shell and/or the outer cover, identical or different plastics that can even be used for the various elements forming the protective housing, are for example:
  Polyethylene Terephthalate Glycol (PETG) and the derivatives thereof PET and APET,
  Polymethacrylate: PMMA,
  Polyethylene PE or High Density Polyethylene PEhd,
  Acryloitrile Butadiene Styrene: ABS,
  acrylic resin co-extruded on ABS: ABS/PMMA,
  Polycarbonate: PC,
  Acryloitrile Butadiene Styrene/Polycarbonate: ABS/PC—(two-material),
  Polyvinyl Chloride: PVC or KYDEX,
  PolyPropylene: PP,
  Polystyrene: PS,
  Polystyrene/Polyethylene: PS/PE—(two-material),
  Polyamide: PA.

Preferably, the upper shell and the lower shell are made from the same common material, and preferably in that the outer cover that covers the upper shell and that closes the lower shell, when there is one, is also made from this same common material. The fact that, at least the two shells, lower and upper, and advantageously also the outer cover, are all made from a single and same common material, not only simplifies the manufacture of the protective housing, but above all simplifies all of the operations of biopharmaceutical validation and compatibility. This same common material can be a simple material or a composite material such as for example a two-material.

Preferably, the protective housing can be stacked. In this way, the stacking of the protective housings one on the other is facilitated, while preventing even more the direct transmission of vertical stress on the bag.

Preferably, when the two housings are stacked one in the other, the bottom of the lower shell of the housing above bears against either the cover of the housing below or on the upper shell of the housing below. This allows for a better distribution of the forces over the entire plane of the convex upper shell rather than on only the walls of the concave lower shell, thus preventing the creation of a zone of fragility on the concave lower shell. The robustness of the protective housing is thus less stressed during the stacking of these protective housings on top of one another.

Preferably, the side walls of the lower shell comprise one or several shoulders, preferably parallel to the mean plane of the bottom of the lower shell, against which the cover bears. This assists in distributing the forces better over the entire cover and over the entire lower shell, and consequently over the entire protective housing.

Preferably, the side walls of the lower shell comprise one or several shoulders, preferably parallel to the mean plane of the bottom of the lower shell, against which the upper shell bears. This assists in distributing the forces better over the entire upper shell and over the entire lower shell, and consequently over the entire protective housing.

Preferably, the side walls of the lower shell comprise one or several shoulders, preferably orthogonal to the mean plane of the bottom of the lower shell, against which the upper shell longitudinally abuts when it is inserted into the lower shell. This assists in the holding of the upper shell between the walls of the lower shell, this therefore contributes to the improvement in the holding of the bag in the protective housing, since the bag is itself in the housing of the upper shell.

Preferably, the upper shell comprises one or several longitudinal bag fasteners, and the upper shell comprises no other lateral fastener of bag. The longitudinal holding alone of the bag is sufficient to correctly hold the bag between the walls of the lower shell, simplifying the structure and the arrangement of the elements for holding this bag. Thus, the holding of the bag is improved, while still simplifying the structure of the upper shell and of the bag. Moreover, the method of assembling the bag in its protective housing will thus be made shorter and easier, i.e. more ergonomic.

Preferably, the upper shell comprises one or several chicanes formed in a side wall of the upper shell opposite the side wall of the fastener and for guiding one or several tubes. This allows for the holding of the tube or tubes, when the bag is inserted into the protective housing. Preferably, the upper shell comprises one or several chicanes formed in each one of the two side walls of the upper shell connecting on the one hand the side wall of the fastener to one the other hand the side wall opposite the side wall of the fastener, with these chicanes being for guiding one or several tubes.

Preferably, in an alternative, when the upper shell is spaced sufficiently from the bottom of the lower shell, so as to reduce the depth of the chicanes and facilitate the installation of the tubes around the housing, the distance between the opening of the housing and the bottom of the lower shell is greater than or equal to half, preferably three-quarters, of the depth of the housing, and in that, at least when the upper shell is inserted into the lower shell, chicanes are arranged around the housing in such a way as to be able to hold in place around the housing at least one tube coming from the bag.

Preferably, the bag is longitudinally fastened in the protective housing, and the bag is not fastened elsewhere than longitudinally in the protective housing. The holding of the bag remains good, while still simplifying the fastening system. Thus, the holding of the bag is improved, while still simplifying the structure of the upper shell and of the bag. In addition, the method of assembly is also facilitated.

Preferably, the biopharmaceutical liquid bag is flat and elongated and has on its bag bottom a handle connected to said bottom by a connection of plane form, and on the opposite side one or several connections for tube.

Preferably, the bag is not fastened elsewhere than longitudinally in the upper shell. The holding of the bag remains good, while still simplifying the fastening system. Thus, the holding of the bag is improved, while still simplifying the structure of the upper shell and of the bag. In this way, the reduction in the longitudinal movement of the bag in the housing of the upper shell is carried out solely by two longitudinal fasteners, which improves the compromise between effectiveness in holding and simplicity of the structure as assembly.

Preferably, the bag has on its bag bottom a handle and on the side opposite its bag bottom one or several connections for tube.

Preferably, the bag is attached on one longitudinal end of the upper shell by its handle, and the bag is immobilised on the other longitudinal end of the upper shell by the simple longitudinal tension exerted by the tube or tubes on the bag. This simple longitudinal tension exerted by the tube or tubes on the bag is obtained by the blocking of the tube or tubes on this longitudinal end of the bag, for example by jamming the tube or tubes into a chicane of the front side wall of the upper shell. This further improves the holding of the bag, while still reducing its longitudinal movement in the housing by a simple fastener of a longitudinal side cooperating with a simple tension of the other longitudinal side.

Preferably, the bag is a flexible bag. The bag is advantageously flexible in order to be deformed under the effect of the liquid that it contains. The bag is advantageously flexible in order to be deformed under the effect of a solution that has a density close to that of water. The flexible bag is advantageously a single-use bag, i.e. a bag that is disposable after a single use. Other characteristics and advantages of the invention shall appear when reading the following description of a preferred embodiment of the invention, given as an example and in reference to the accompanying drawings.

DETAILED DESCRIPTION OF THE INVENTION

Figure 1:
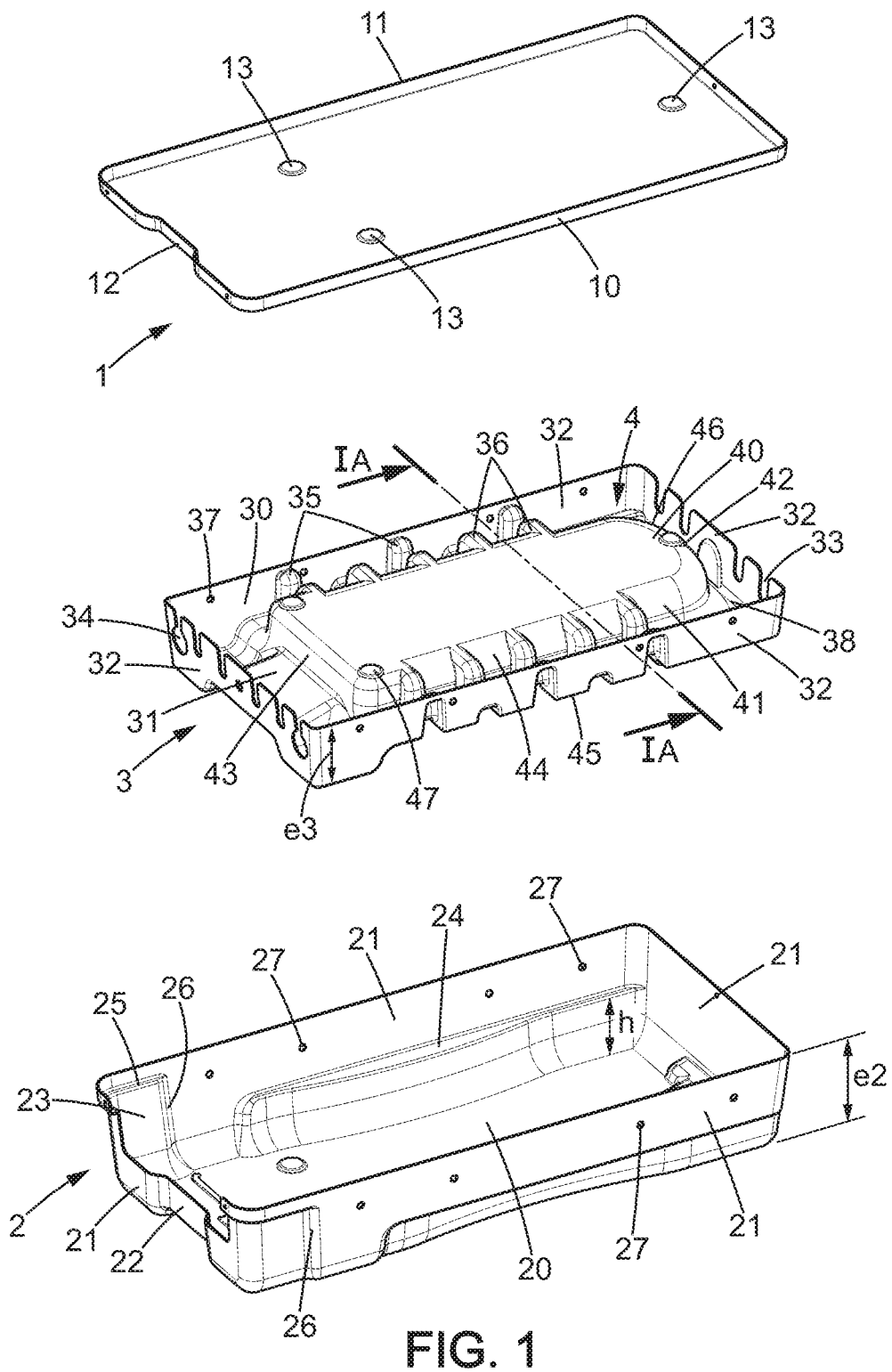
FIG. 1 diagrammatically shows an exploded view of an example of a protective housing without a bag according to an embodiment of the invention.

FIG. 1 diagrammatically shows an exploded view of an example of a protective housing without a bag according to an embodiment of the invention.

The protective housing comprises a lower shell 2, an upper shell 3 that has a housing 4, an outer cover 1. The biopharmaceutical liquid bag, not shown in FIG. 1, is placed in the bottom 20 of the lower shell 2, covered by the upper shell 3 in such a way as to be in the housing 4, the upper shell 3 being inserted into the lower shell 2 and being covered by an outer cover 1 closing the protective housing. The thickness e3 of the upper shell 3 is less than the thickness e2 of the lower shell 2. Thus, the upper shell 3 can be inserted into the lower shell 2 without exceeding the latter in height.

The lower shell 2 comprises a bottom 20 and four side walls 21, among which the lateral side walls 21 as well as the front and rear side walls 21. On its front side wall 21, is a recess 22 towards the inside of the lower shell 2. In its front side wall 21, above the recess 22, the lower shell 2 has an opening 23 through which the tubes of the bag can exit. The lateral side walls 21 have horizontal shoulders 24 on which the upper shell 3 will be able to be placed, and more particularly the edge 45 of the upper shell 3. The height h between the horizontal shoulders 24 and the bottom 20 of the lower shell 2 corresponds to the distance between the opening of the housing 4 and the bottom of the lower shell 2. The lateral side walls 21 also have horizontal shoulders 25 on which the outer cover 1 will be able to be placed, and more particularly the edge 11 of the outer cover 1. The lateral side walls 21 further have vertical shoulders 26 against which the upper shell 3 will be able to abut, and more particularly the front side wall 32 of the upper shell 3. The lateral side walls 21 also have holes 27 through which fastening rivets will pass making it possible to fasten together the lower shell 2 and the upper shell 3.

The upper shell 3 comprises a housing 4 at its middle. The upper shell 3 has side walls 32, two lateral side walls 32, a front side wall 32 and a rear side wall 32. Between the housing 4 and the front side wall 32 is a space 30 comprising a passage 31 through which the tubes of the bag will exit from the housing 4 then open outside of the protective housing by passing through the outlet opening 23 of the lower shell 2. The rear side wall 32 of the upper shell comprises a fastener 33 in the form of several notches 33 made in this rear side wall 32. The handle of the bag bottom is intended to be fastened onto this fastener 33. The front side wall 32 of the upper shell 3 also comprises chicanes 34 in the form of notches 34 between which the bag tubes can pass and be held in place. The front side wall 32 of the upper shell 3 abuts against the vertical shoulders 26 of the lower shell 2. The lateral side walls 32 comprise protuberances 35 cooperating with the protuberances 36 of the lateral side walls 41 of the housing in order to form chicanes in which the bag tubes can pass and be held in place. The lateral side walls 32 of the upper shell 3 also have holes 37 through which will pass fastening rivets that make it possible to fasten together the lower shell 2 and the upper shell 3. Between the housing 4 on the one hand and the side walls 32 of the upper shell is an annular space 38 in which will be able to be arranged one or several tubes of the bag. This annular space 38 is therefore a storage space for all or a portion of the tubes of the bag.

The housing 4, intended to receive the bag, has a bottom 40, here in the ceiling position, lateral side walls 41, a front side wall 43 from which the passage 31 departs, a rear side wall 42 that forms the rear of the housing 4 against which is the bottom of the bag comprising the handle of the bag. Between the side walls 41 to 43 of the housing 4 and the side walls 32 of the upper shell 3 is an annular edge 45 that forms the bottom of the annular space 38. It is this annular edge 45 of the upper shell 3 that will rest on the horizontal shoulders 24 of the lower shell 2. It is on the rear portion 46 of this annular edge 45 that the connection between the handle and the bag bottom will be wound, when the bag handle is attached onto the fastener 33. The bottom 40 of the housing 4 comprises small circular protuberances 47 intended to receive the circular cavities 13 of the bottom 10 of the outer cover 1, when this outer cover 1 will rest on the bottom 40 of the housing 4 of the upper shell 3. The bottom 40 of the housing 4 of the upper shell 3 is at the same level as the upper edge of the side walls 32 of the upper shell 3.

A cover 1 comprises a bottom 10 and an annular edge 11, as well as a recess 12 in the front portion of this edge 11 and circular cavities 13 intended to be nested with the protuberances 47 of the upper shell 3, when the outer cover 1 rests on the bottom 40 of the housing 4 of the upper shell 3.

Figure 1A:
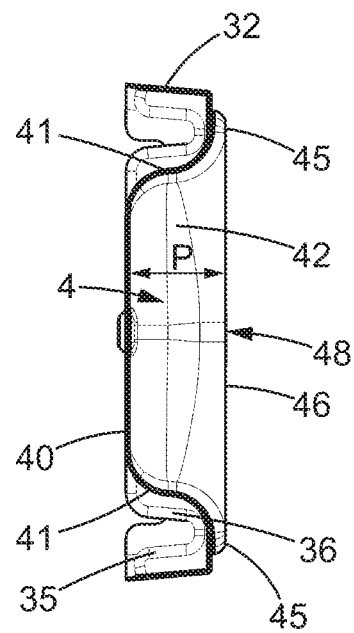
FIG. 1A diagrammatically shows a coupe AA of the upper shell shown in FIG. 1.

FIG. 1A diagrammatically shows a section AA of the upper shell shown in FIG. 1.

The housing 4 has a bottom 40 of the lateral side walls 41 and a rear side wall 42 of the housing 4. The opening 48 of the housing 4 is surrounded by the annular edge 45 of which the rear portion 46 extends the rear side wall 42 of the housing 4. Between the lateral side walls 32 of the upper shell 3 and the lateral side walls 41 of the housing 4 are arranged chicanes formed by the cooperation between on the one hand the protuberances 35 of the lateral side walls 32 of the upper shell 3 and on the other hand the protuberances 36 of the lateral side walls 41 of the housing 4. The depth p of the housing 4 is the distance between the opening 48 (materialised by the annular edge 45 of which its rear portion 46) and the bottom 40 of the housing 4.

Figure 2:
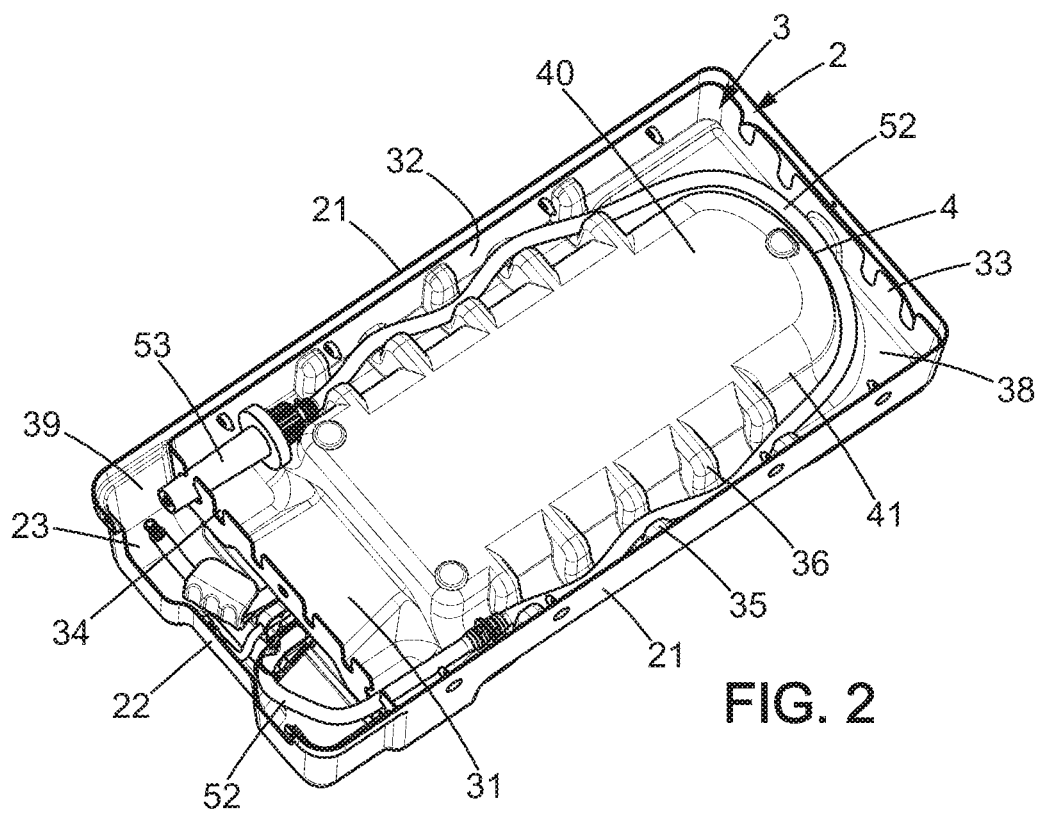
FIG. 2 diagrammatically shows an assembled view in perspective of an example of a protective housing that integrates a bag according to an embodiment of the invention.

FIG. 2 diagrammatically shows an assembled view in perspective of an example of a protective housing that integrates a bag according to an embodiment of the invention.

The upper shell 3 has been fully inserted into the lower shell 2. The side walls 32 of the upper shell 3 slid along side walls 21 of the lower shell 2, and are practically against them, once the upper shell 3 is resting on the horizontal shoulders 24 (not visible here) of the lower shell 2. The bag that is not visible in FIG. 2 is in the housing 4 between the upper shell 3 and the lower shell 2. The tubes 52 of the bag exit through the passage 31, opening into the free space 39 between the front side walls of the two shells, before passing in the chicanes 34 in the form of notches to go around the housing 4 in the free space 38 by passing in the chicanes 35 and 36. A connector 53 at the end of the tube 52 is fastened in the chicane 34 of the front side wall 32 of the upper shell 3. A tube could also exit via the outlet opening 23.

Figure 3:
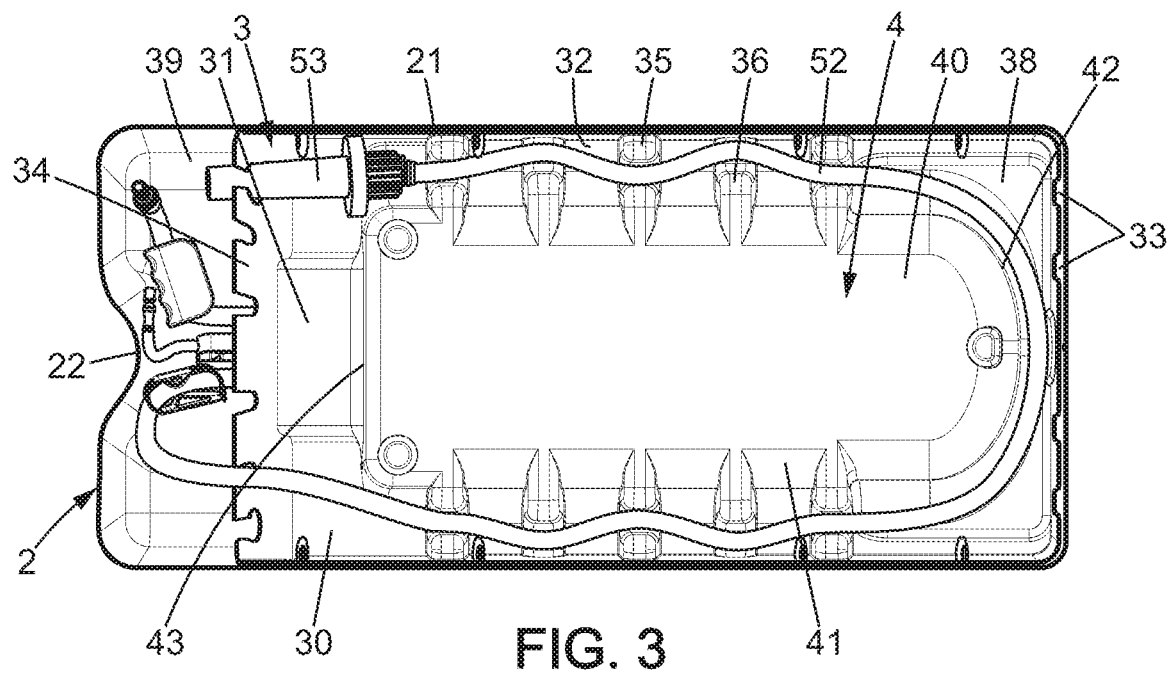
FIG. 3 diagrammatically shows an assembled top view of an example of a protective housing that integrates a bag according to an embodiment of the invention.

FIG. 3 diagrammatically shows an assembled top view of an example of a protective housing that integrates a bag according to an embodiment of the invention.

The upper shell 3 is fully inserted into the lower shell 2, the side walls 32 of the upper shell 3 being practically against the side walls 21 of the lower shell 2. The tube 52, attached to the bag contained in the housing 4, exited through the passage 31, opens into the free space 39 situated between the front side walls of the two shells, passes in the chicane 34 in the shape of a notch, goes around the housing 4 in the free space 38 situated between the walls 41 to 43 of the housing 4 and the side walls 32 of the upper shell 3, by passing through the chicanes 35 and 36, to be blocked by its connector 53 in the chicane 34.

Figure 4:
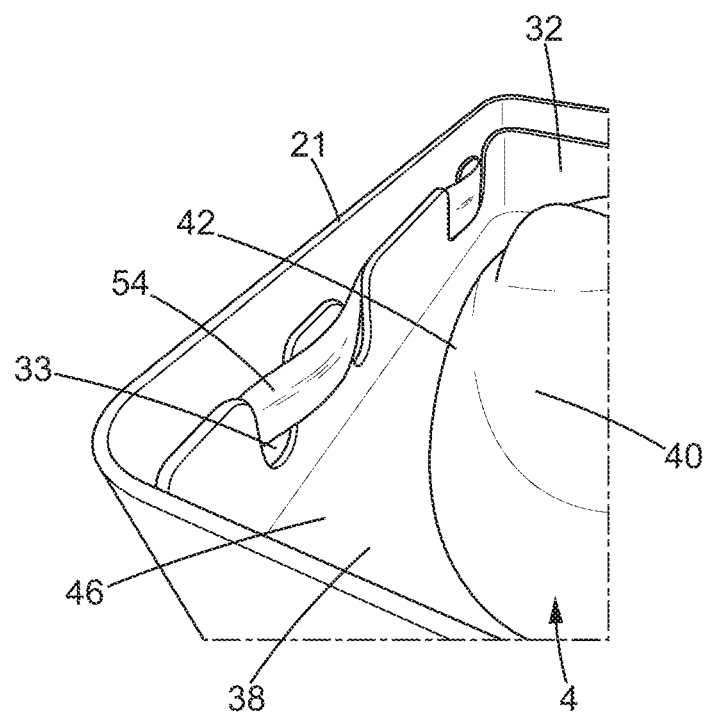
FIG. 4 diagrammatically shows a detailed view in perspective of an example of a fastener of the upper shell of the protective housing that cooperates with the handle of a bag according to an embodiment of the invention.

FIG. 4 diagrammatically shows a detailed view in perspective of an example fastener of the upper shell of the protective housing cooperating with the handle of a bag according to an embodiment of the invention.

The handle 54 that extends the bag bottom is attached on the fastener 33 in the shape of notches of the rear side wall 32 of the upper shell 3. This handle 54 passes through notches 33 by passing alternating from one side then the other side of the rear side wall 32 of the upper shell 3. The connection situated between the handle 54 and the bag bottom is wound from underneath (therefore not visible in FIG. 3) around the rear edge 46 of the upper shell 3, with this rear edge 46 joining the rear side wall 32 of the upper shell 3 to the rear side wall 42 of the housing 4. In FIG. 3, there is no bag tube in the free space 38.

Figure 5A:
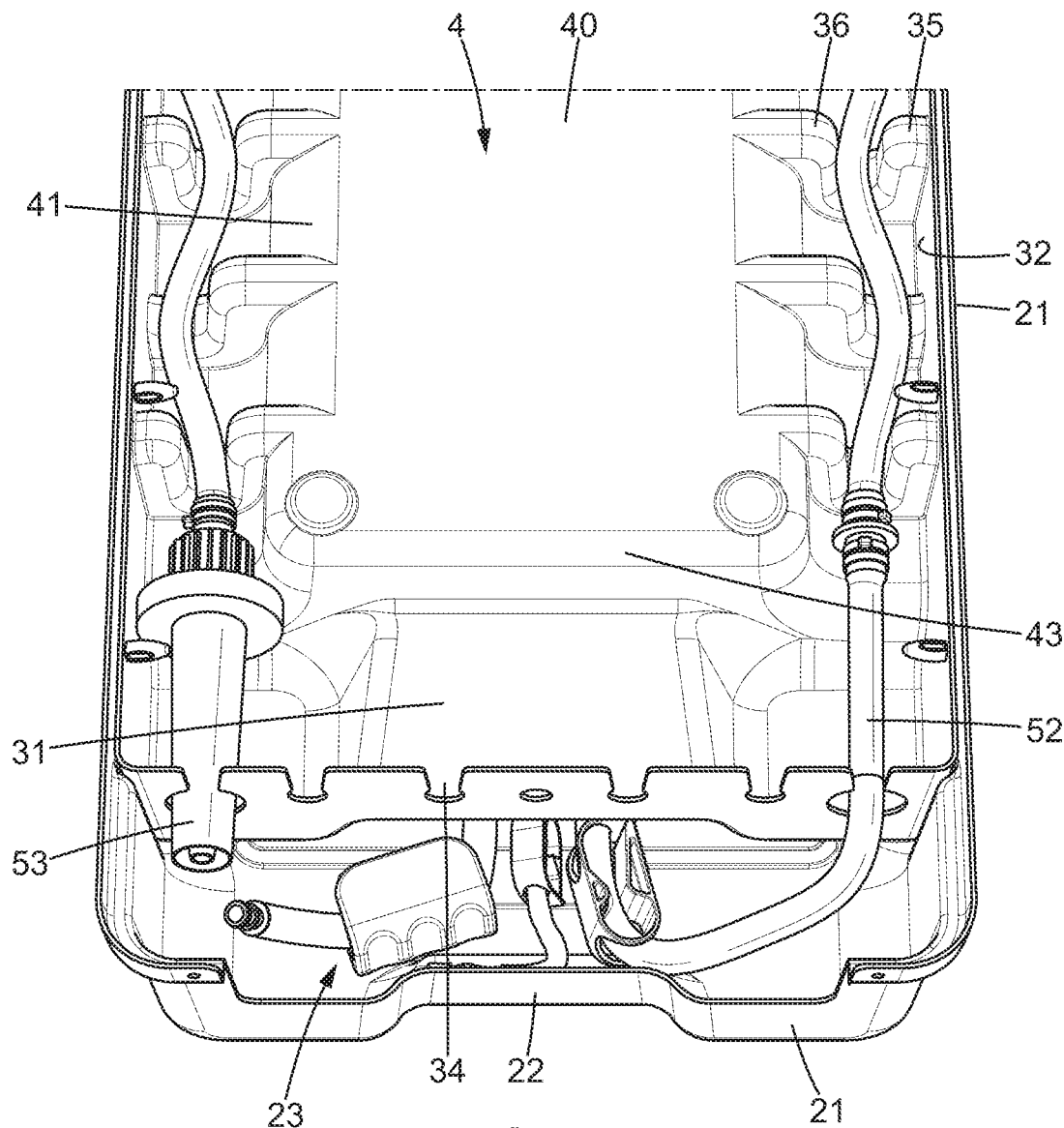
FIG. 5A diagrammatically shows a partial view in perspective of an example of a longitudinal end of the upper shell of protective housing according to an embodiment of the invention.

FIG. 5A diagrammatically shows a partial view in perspective of an example of a longitudinal end of the upper shell of the protective housing according to an embodiment of the invention.

The upper shell 3 is fully inserted into the lower shell 2, the side walls 32 of the upper shell 3 being practically against the side walls 21 of the lower shell 2. The tube 52, attached to the bag contained in the housing 4, exited via the passage 31, opens into the free space 39 situated between the front side walls of the two shells, passes in the chicane 34 in the shape of a notch, goes around the housing 4 in the free space 38 situated between the walls 41 of the housing 4 and the side walls 32 of the upper shell 3, passing through the chicanes 35 and 36, to be blocked by its connector 53 in the chicane 34.

Figure 5B:
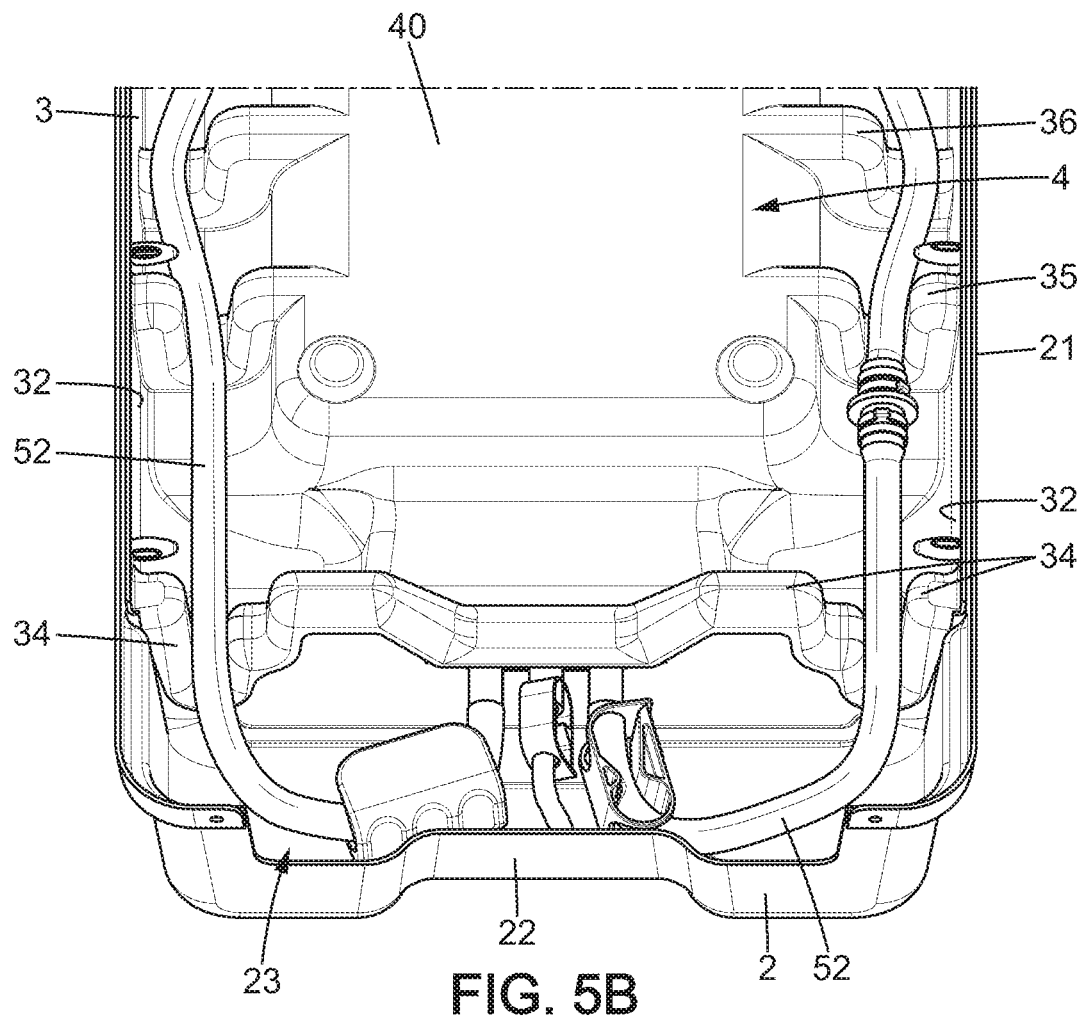
FIG. 5B diagrammatically shows a partial view in perspective of an alternative example of a longitudinal end of the upper shell of the protective housing according to an embodiment of the invention.

FIG. 5B diagrammatically shows a partial view in perspective of an alternative example of a longitudinal end of the upper shell of the protective housing according to an embodiment of the invention.

FIG. 5B is similar to FIG. 5A. Only the shape of the chicane 34 changes. Here, instead of being one or several simple notches in a plane front side wall of the upper shell 3, this chicane 34 is formed from a succession of tubular segments and bends, having the advantage of being less aggressive against the walls of the tubes 52 when the latter are stuck in these chicanes 34, thus preventing the outer layer of these tubes 52 from being damaged.

Figure 6:
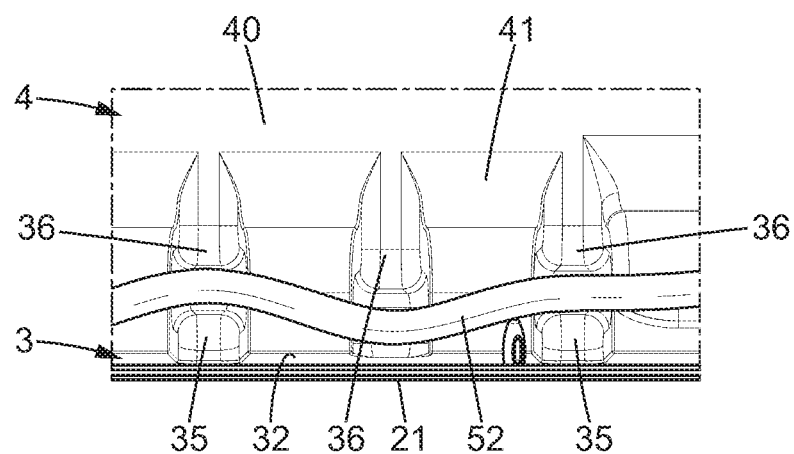
FIG. 6 diagrammatically shows a detailed top view of an example of chicanes of the upper shell of the protective housing according to an embodiment of the invention.

FIG. 6 diagrammatically shows a detailed top view of an example of chicanes of the upper shell of the protective housing according to an embodiment of the invention.

The detail of the chicanes formed by the successions of protuberances 35 and 36 between on the one hand the lateral side walls 41 of the housing 4 and on the other hand the lateral side walls 32 of the upper shell 3 is shown. A protuberance 36 running along the lateral side wall 41 of the housing 4 is surrounded by two shorter protuberances 36 of the lateral side wall 41 of the housing 4, while facing, an absence of protuberance 35 of the lateral side wall 32 of the upper shell 3 is surrounded by two protuberances 35 of the lateral side wall 32 of the upper shell 3. Here again, the lateral side wall 32 of the upper shell 3 is practically situated against the lateral side wall 21 of the lower shell 2.

FIGS. 7A, 7B, 7C and 7D, diagrammatically show as a top view four successive steps of an example of the method for assembling a protective assembly of a bag according to an embodiment of the invention.

Figure 7A:
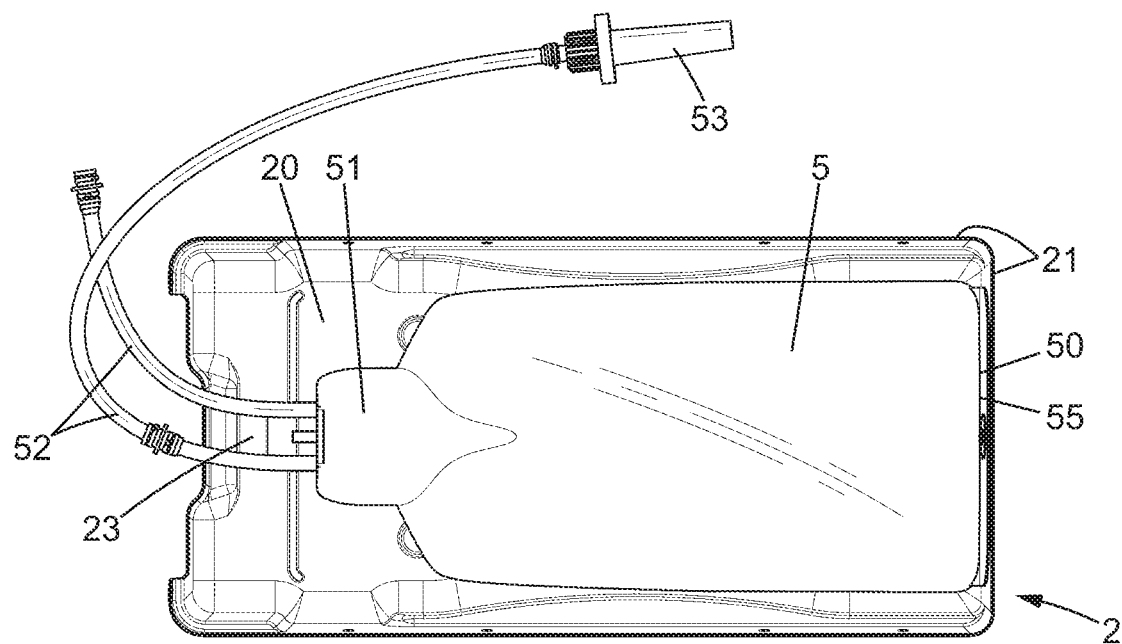
FIGS. 7A, 7B, 7C and 7D, diagrammatically show as a top view four successive steps of an example of a method of assembling a protective assembly of a bag according to an embodiment of the invention.

In FIG. 7A, the bag 50 is arranged in the bottom 20 of the lower shell 2. From an upper opening 51 of bag 50 depart tubes 52 terminated by connectors 53, these tubes 52 exiting through the outlet opening 23 of the lower shell 2. The bottom 55 of the bag 50 is on the side of the rear side wall 21 of the lower shell 2.

Figure 7B:
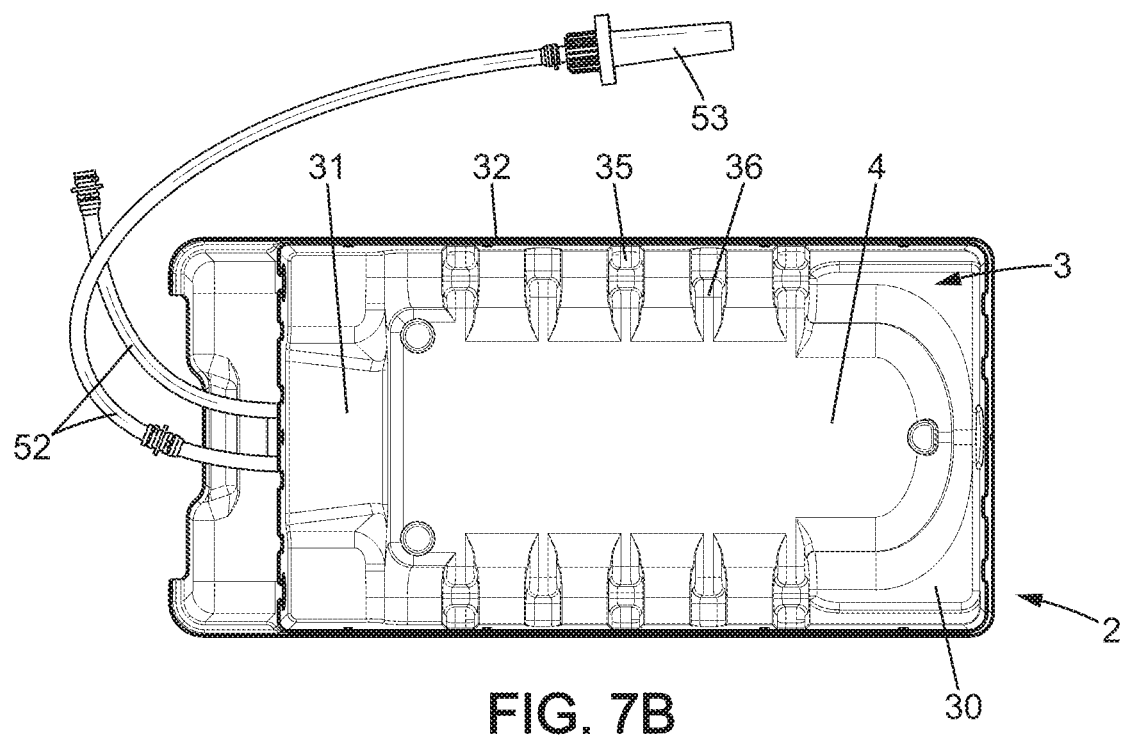

In FIG. 7B, the upper shell 3 covers the bag 50 which is therefore no longer visible. Only the tubes 52 exiting from the upper shell 3 through the passage 31 are still visible. The annular free space 38 goes around the housing 4 inside the side walls 32 of the upper shell 3. This annular free space 38, provided with chicanes 35 and 36, is empty, because it does not yet contain the tubes 52.

Figure 7C:
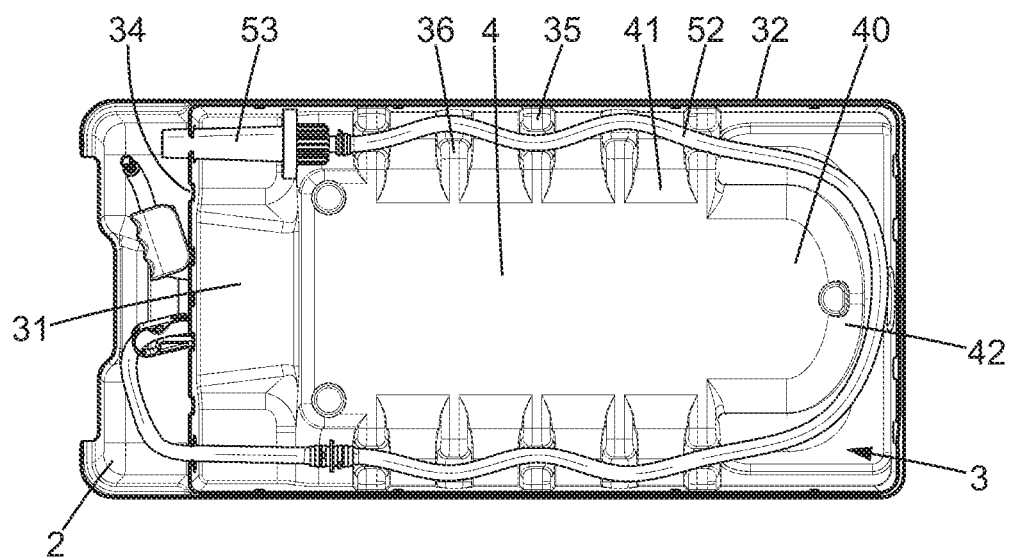

In FIG. 7C, the tubes 52, exited from the passage 31, having opened between the front side walls of the two shells, pass through the chicanes 34, go around the housing 4 inside the side walls 32 of the upper shell 3 by passing through the chicanes 35 and 36, before the connector 53 of one of these tubes 52 is blocked in the chicane 34, another connector 53 is located between the rear side wall 42 of the housing 4 and the rear side wall 32 of the upper shell 3.

Figure 7D:
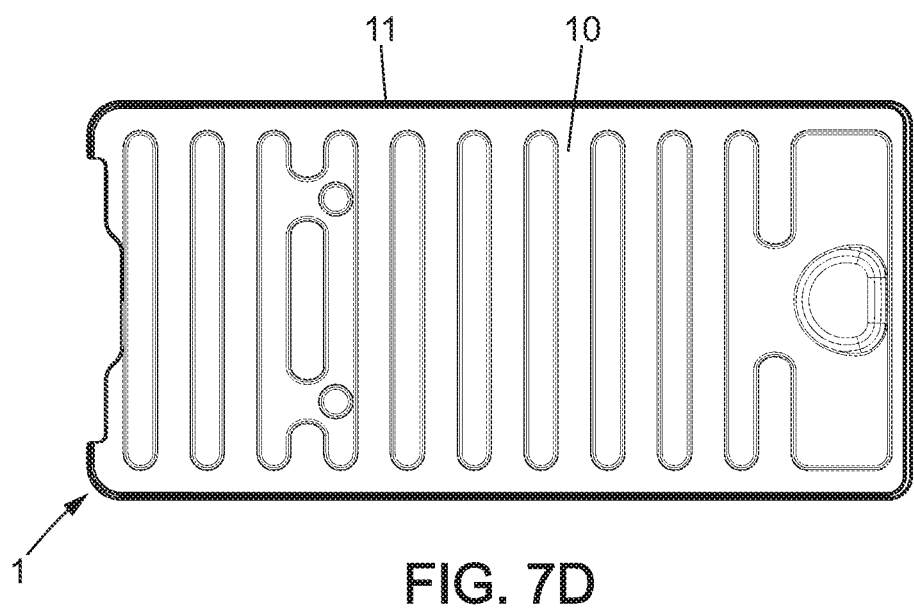

In FIG. 7D, the outer cover 1 having a bottom 10 and an annular edge 11, can then be used to cover the upper shell 3 and thus close the lower shell 2, the protective housing then being fully closed.

According to another method of assembling the bag in its protective housing, which is shorter and easier, therefore more ergonomic than the one shown in liaison with FIGS. 7A to 7D, in order to easily carry out the assembly of the protective housing, even with the empty bag inside this protective housing, a method of assembly of a protective assembly of a biopharmaceutical liquid bag according to the invention is provided, successively comprising the following steps. Firstly, an operator attaches, using a first of his hands, the bag by its handle to the upper shell, with this upper shell being in the vertical position. Then, with this upper shell remaining in the vertical position, this operator positions and maintains, by the second of his hands, the end of the bag opposite its handle against the upper shell in such a way that the bag is in its upper shell housing. Then, this operator places the upper shell containing the bag in the lower shell placed in horizontal position. Finally, this operator can close the lower shell by covering it with an outer cover and/or this operator can stack the protective housing filled by the bag onto another protective housing also filled by its bag.

Figure 8A:
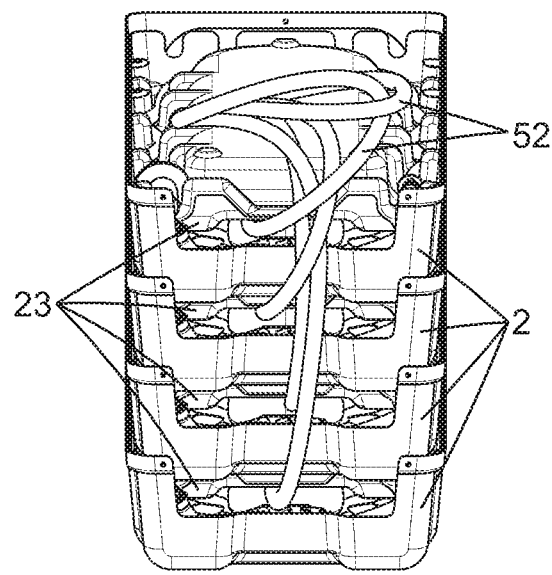
FIGS. 8A and 8B diagrammatically show in perspective examples of stacking of several protective housings one on the other that integrate bags according to an embodiment of the invention.
Figure 8B:
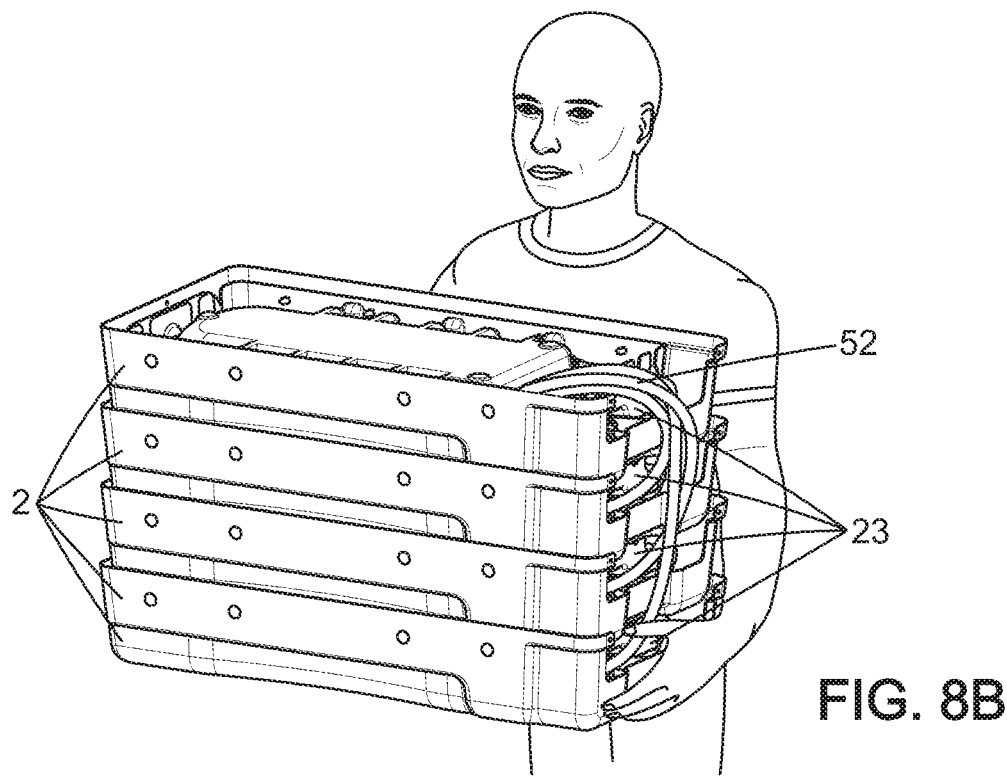

FIGS. 8A and 8B diagrammatically show in perspective examples of stacking on one another of several protective housings that integrate bags according to an embodiment of the invention.

Four protective housings are stacked one on the other. They each contain a bag of which the tube or tubes 52 exit respectively by the outlet openings 23 of their lower shells 2.

Figure 8C:
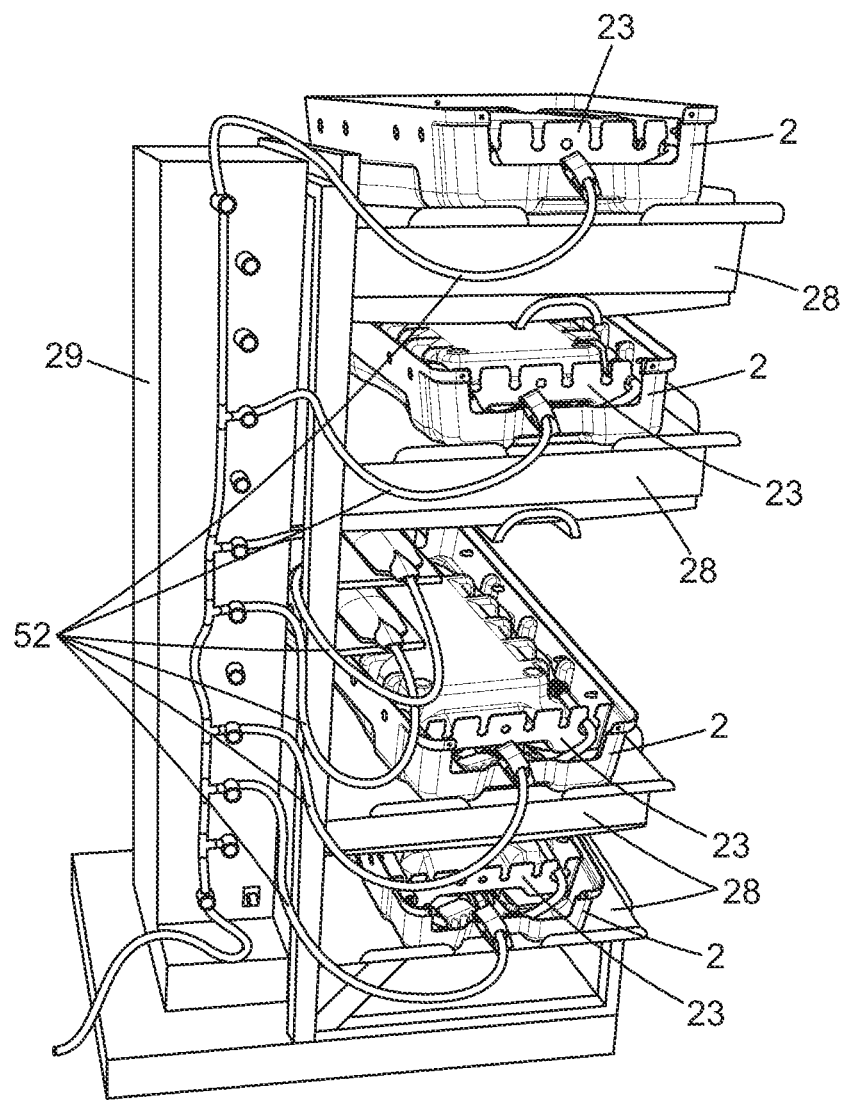
FIG. 8C diagrammatically shows in perspective an example of a group of several protective housings that integrate bags according to an embodiment of the invention.

FIG. 8C diagrammatically shows in perspective an example of a group of several protective housings that integrate bags according to an embodiment of the invention.

Four protective housings are respectively arranged on the shelves 28 of a piece of furniture 29. They each contain a bag of which the tube or tubes 52 exit respectively by the outlet openings 23 of their lower shells 2.

Of course, the present invention is not limited to the examples and embodiments described and shown, but many alternatives accessible to those skilled in the art can be applied to it.

The invention claimed is:

1. Protective housing for a biopharmaceutical liquid bag, comprising:
   a lower shell comprising a bottom and side walls,
   an upper shell:
      which comprises a housing for receiving the bag, and
      protuberances surrounding said housing and configured to secure at least one tube coming from said bag along an exterior facing side of said housing,
      and wherein said upper shell is capable of being inserted into the lower shell,
         in such a way that a first opening of the housing is adjacent to and facing the bottom of the lower shell,
         in such a way that an entire volume of the bag is received within the housing, in such a way that the protuberances are between the side walls of the lower shell, and in such a way that the upper shell is laterally held in place between the side walls of the lower shell.

2. Protective housing according to claim 1, wherein a distance between the first opening of the housing and the bottom of the lower shell is at least three times less than a depth of the housing.

3. Protective housing according to claim 1, wherein the upper shell is capable of being inserted into the lower shell in such a way that the first opening of the housing is in contact with the bottom of the lower shell.

4. Protective housing according to claim 1, wherein the housing comprises a housing bottom, and housing side walls extending substantially perpendicularly to said bottom.

5. Protective housing according to claim 4, wherein the upper shell is capable of being inserted into the lower shell in such a way that an outer periphery of the upper shell is guided by the side walls of the lower shell.

6. Protective housing according to claim 1, wherein the upper shell has outer side walls surrounding side walls of the housing and extending substantially parallel to the side walls of the housing.

7. Protective housing according to claim 1, wherein a thickness of the upper shell is less than a thickness of the lower shell.

8. Protective housing according to claim 7, wherein the upper shell is capable of being fully inserted into the lower shell.

9. Protective housing according to claim 1, wherein the upper shell is capable of being inserted into the lower shell in such a way as to not extend outside the lower shell in height.

10. Protective housing according to claim 1, wherein the upper shell also comprises, at least on one end of the housing for receiving a bottom of the bag, an edge surrounding the first opening of the housing, extending substantially in the plane of the first opening of the housing.

11. Protective housing according to claim 10, further comprising notches located on a side wall of said upper shell and said end of the housing, wherein a portion of the edge of the upper shell, situated between the notches, is arranged in such a way that, when a handle of a bottom of the bag attaches to said notches, the connection between the handle and the bottom of the bag is wound around said portion of the edge.

12. Protective housing according to claim 1, wherein the upper shell comprises two lateral side walls and two longitudinal side walls, said lateral and longitudinal walls surrounding the housing wherein a first longitudinal side wall of said two longitudinal side walls comprises notches configured such that a handle of a bottom of the bag is capable of being attached to the notches.

13. Protective housing according to claim 1, wherein the upper shell further comprises a first side wall located at a first longitudinal end of said upper shell, and wherein a portion of said first side wall comprises a recess which defines a passage for a tube or tubes of the bag extending from said first opening of said housing to an exterior of the upper shell.

14. Protective housing according to claim 13, wherein the lower shell extends further longitudinally than said upper shell when said upper shell is inserted in said lower shell, the lower shell comprising a first portion for receiving said upper shell and a second portion which bounds a second opening for the tube or tubes of the bag between the first longitudinal end of said upper shell and a first longitudinal end of said lower shell, said second opening being in fluid communication with said passage and the exterior.

15. Protective housing according to claim 14, wherein said side walls of the lower shell comprise a recess arranged towards the inside of the lower shell and situated above or below an outlet of aid second opening.

16. Protective housing according to claim 1, wherein the upper shell and the lower shell are made of plastic.

17. Protective housing according to claim 16, wherein the plastic is polyethylene terephthalate glycol (PETG).

18. Protective housing according to claim 1, wherein the upper shell and the lower shell are made from a same common material, and an outer cover that covers the upper shell and that closes the lower shell, when there is one, is also made from the same common material.

19. Protective housing according to claim 1, wherein the protective housing is capable of being stacked.

20. Protective housing according to claim 19, further comprising a second housing and wherein the housing and the second housing are stacked one in the other, the bottom of the lower shell of the housing above bears against either a cover of the housing below or on the upper shell of the housing below.

21. Protective housing according to claim 1, wherein the side walls of the lower shell comprise one or several shoulders, parallel to the plane of the bottom of the lower shell, against which a cover bears.

22. Protective housing according to claim 1, wherein the side walls of the lower shell comprise one or several shoulders, parallel to the plane of the bottom of the lower shell, against which the upper shell bears.

23. Protective housing according to claim 1, wherein the side walls of the lower shell comprise one or several shoulders, orthogonal to the plane of the bottom of the lower shell, against which the upper shell longitudinally abuts when it is inserted into the lower shell.

24. Protective housing according to claim 1, wherein the upper shell comprises one or several longitudinal ends having notches configured to attach to the bag.

25. Protective housing according to claim 1, wherein the protuberances are formed in a first side wall of the upper shell opposite a second side wall of the upper shell for guiding one or several tubes.

26. Protective housing according to claim 1, wherein a distance between the opening of the housing and the bottom of the lower shell is greater than or equal to half, of the depth of the housing, and at least when the upper shell is inserted into the lower shell, said protuberances are surrounding the housing in such a way as to be able to hold in place around the housing at least one tube coming from the bag.

27. Protective assembly for a biopharmaceutical liquid bag comprising:

a protective housing according to claim 1, a biopharmaceutical liquid bag placed in said protective housing.

28. Protective assembly for a biopharmaceutical liquid bag according to claim 27, wherein:

the bag is longitudinally fastened in the protective housing, the bag is not fastened elsewhere than longitudinally in the protective housing.

29. Protective assembly for a bag for receiving a biopharmaceutical liquid comprising:

a protective housing according to claim 1, an empty bag for receiving biopharmaceutical liquid placed in said protective housing.

30. A protective housing for a biopharmaceutical bag, comprising:
- a lower shell comprising a bottom and side walls,
- an upper shell:
  - which comprises a housing for receiving the bag,
  - and which is capable of being inserted into the lower shell,
    - in such a way that an opening of the housing is adjacent to and facing the bottom of the lower shell,
    - and in such a way that the upper shell is laterally held in place between the side walls of the lower shell, and
- an outer cover that covers the upper shell and that closes the lower shell,
- wherein the lower shell and the upper shell are integrally fastened together by rivets in such a way as to not be able to be detached from one another later without damage to the upper shell of the lower shell, and in that the lower shell also comprises holes in one or several side walls of the lower shell, wherein the holes are configured to receive the rivets.

\* \* \* \* \*